(12) United States Patent
Taniguchi et al.

(10) Patent No.: US 6,602,636 B2
(45) Date of Patent: Aug. 5, 2003

(54) BATTERY MODULE

(75) Inventors: Akihiro Taniguchi, Toyohashi (JP); Shinji Hamada, Toyohashi (JP); Noriyuki Fujioka, Kosai (JP); Toyohiko Eto, Toyota (JP); Munehisa Ikoma, Nara (JP); Toshiyuki Sekimori, Toyota (JP); Kazuo Tojima, Toyota (JP); Masayoshi Iwase, Toyota (JP); Tomokazu Yamauchi, Toyota (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 75 days.

(21) Appl. No.: 09/977,704

(22) Filed: Oct. 16, 2001

(65) Prior Publication Data

US 2002/0045095 A1 Apr. 18, 2002

(30) Foreign Application Priority Data

Oct. 16, 2000 (JP) ......................... 2000-314651

(51) Int. Cl.[7] .............. H01M 2/28; H02J 7/00
(52) U.S. Cl. .............. 429/161; 429/100; 429/160; 320/107
(58) Field of Search .................. 429/161, 149, 429/156, 158, 159, 160, 99, 100; 320/107, 112, 116

(56) References Cited

U.S. PATENT DOCUMENTS

| 5,059,496 A | * | 10/1991 | Sindrf .................. 429/101 |
| 6,255,015 B1 | * | 7/2001 | Corrigan et al. ............ 429/149 |
| 6,270,920 B1 | * | 8/2001 | Nakanishi et al. .......... 429/163 |
| 6,275,003 B1 | * | 8/2001 | Marukawa et al. ......... 320/116 |

\* cited by examiner

Primary Examiner—Patrick Ryan
Assistant Examiner—R Alejandro
(74) Attorney, Agent, or Firm—Greenblum & Bernstein, P.L.C.

(57) ABSTRACT

A battery module includes a plurality of cells accommodating an electrode plate group and an electrolyte, and a single integrated battery case for accommodating the plurality of cells. The ratio of the component resistance including the connecting resistance between the cells to the reactive resistance of the electrode plate group and the electrolyte in each cell, is set in the range of 1:99–40:60 at a temperature of 25° C. Thereby, the internal resistance per cell is reduced, and higher power output and improved service life characteristics are achieved.

3 Claims, 6 Drawing Sheets

BATTERY MODULE

The present disclosure relates to subject matter contained in priority Japanese Patent Application No. 2000-314651, filed on Oct. 16, 2000, the contents of which is herein expressly incorporated by reference in its entirety.

BACKGROUND OF THE INVENTION

1. Field of the Invention

The present invention relates to a battery module, and more particularly to a battery module made by connecting a plurality of recharge able batteries.

2. Description of Related Art

Figure 6:
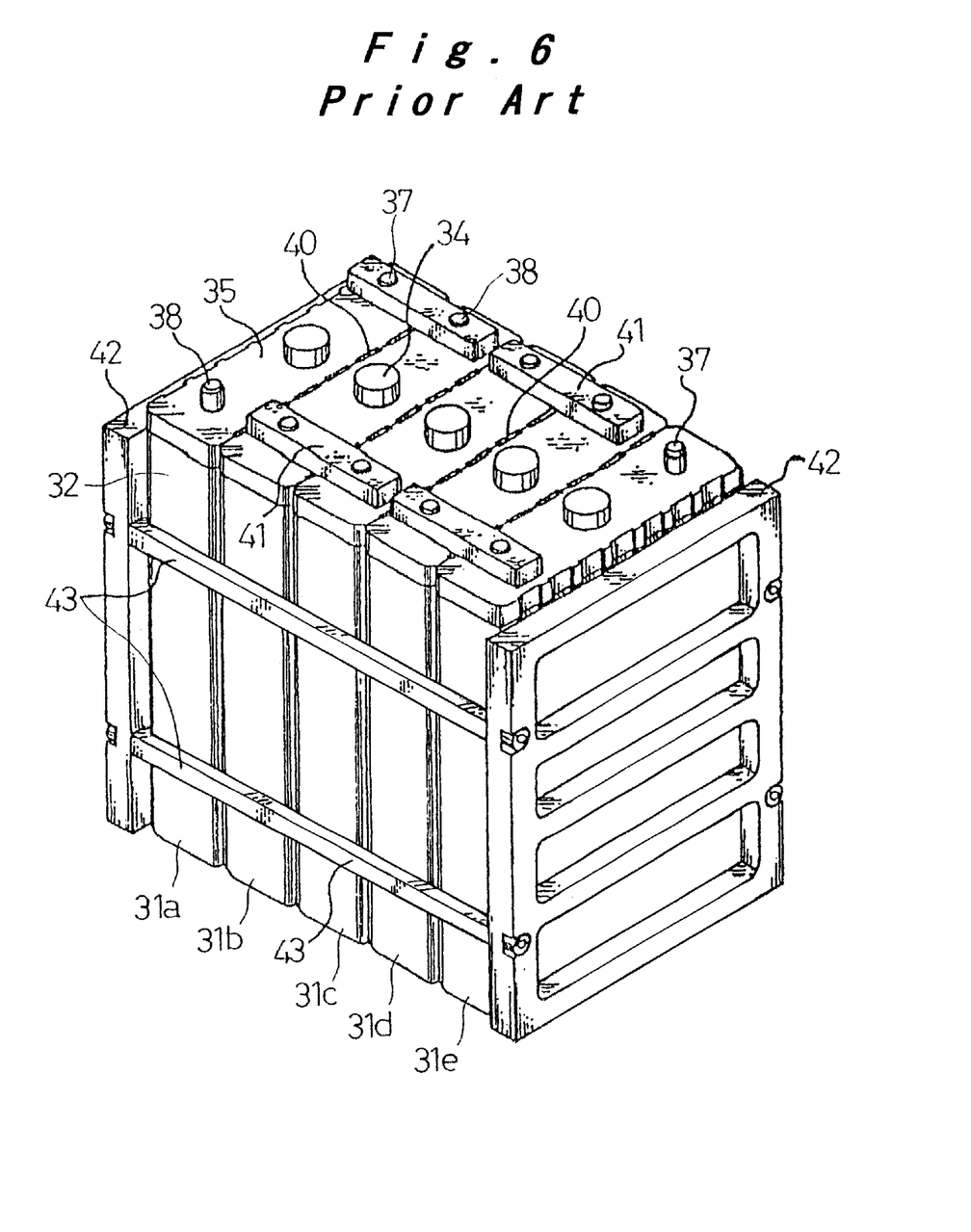
FIG. 6 is an external perspective view of a conventional battery module.
Figure 7:
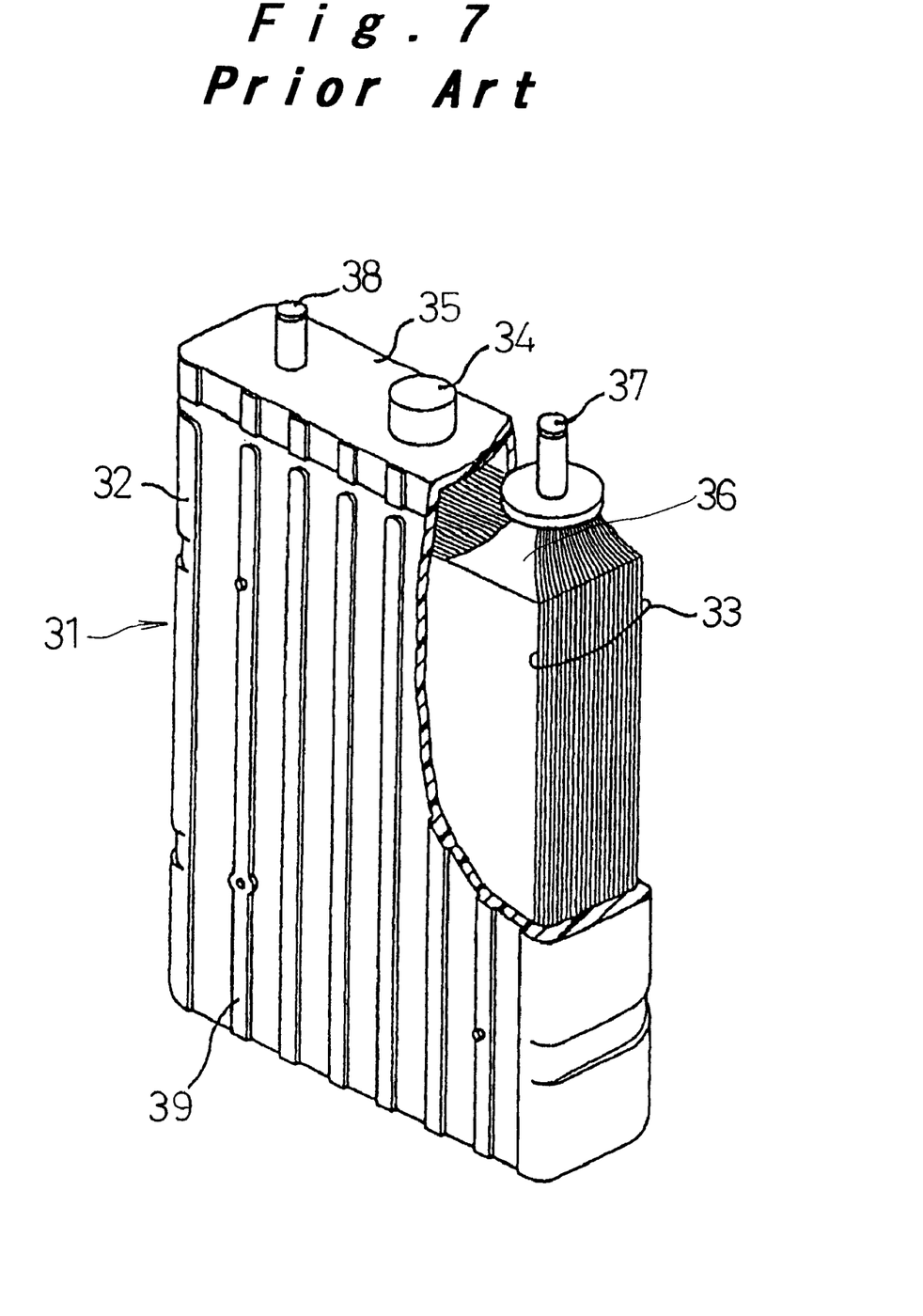
FIG. 7 is a partially cutaway perspective view of a cell of the conventional battery module.

FIG. 6 shows a conventional battery module made by connecting a plurality of cells and coupling them integrally so as to obtain a necessary power capacity. In this battery module, a plurality of cells 31 (31a to 31e) made of sealed alkaline recharge able batteries as shown in FIG. 7 are arranged in a row with the long side walls of the prismatic cell cases 32 adjacent with each other. End plates 42 are placed against the outsides of the cell cases 32 of the cells 31a and 31e at the opposite ends, and the cells, together with the two end plates 42, 42, are bound together with binding strips 43, whereby the plurality of cells are coupled integrally.

The cell 31 is constituted by accommodating an electrode plate group 33 in the cell case 32 together with an electrolyte, and the opening of the cell case 32 is closed with a lid 35 provided with a safety vent 34. The electrode plate group 33 is formed by superimposing a positive electrode plate and a negative electrode plate with a separator interposed between them. From the upper end of the positive electrode plates on one side of the electrode plate group 33, leads 36 are drawn out upward and are connected to a positive electrode terminal 37 there above, and from the upper end of the negative electrode plates on the other side of the electrode plate group, leads 36 are drawn out upward and are connected to a negative electrode terminal 38 there above. The positive electrode terminal 37 and the negative electrode terminal 38 are attached to the lid 35.

In the battery module, the cells 31 are electrically connected in series, by connecting the positive electrode terminals 37 and the negative electrode terminals 38 of neighboring cells 31 with connection plates 41. When the cell cases 32 are coupled, ribs 39 which protrude vertically from the long side walls of the cell cases 32 abut against each other, so as to form a coolant passage 40 parallel to the vertical direction of the cell case 32. The coolant passage 40 is ventilated to cool each of the cells 31a to 31e.

However, this conventional battery module has a problem that the connection path between the cells 31 is long, and a large number of connecting components are required since the connection between the cells 31 is affected such that the leads 36, which extend upward from the electrode plates, are connected to the electrode terminals 37 and 38 attached to the lid 35, and the terminals 37 and 38 are connected with the connection plate 41. Consequently, in this battery module, the component resistance caused by the components is large, and the ratio of the component resistance to the reactive resistance caused by the cell reaction between the positive and negative electrode plates and the electrolyte reaches as high as 40:60 to 50:50. This results in intense heat generation in the battery, preventing the battery module from achieving higher power output and improved service life characteristics.

Moreover, the battery module requires a large number of connecting components due to the complicated construction of the connection between the cells, so that the costs are high. Furthermore, the battery module occupies a relatively large space since the connection portions are exposed to the outside and a space above the cell case 32 is thus required.

SUMMARY OF THE INVENTION

In the light of these problems of the prior art, an object of the present invention is to provide a battery module in which the internal resistance per cell is reduced, and higher power output is achieved.

A battery module of the invention includes a plurality of cells having cell cases that accommodate an electrode plate group and an electrolyte; and an integrated battery case which accommodates the plurality of cells. According to the invention, the ratio of the component resistance per cell including the connecting resistance between the cells, to the reactive resistance in the cell caused by the cell reaction between the electrode plate group and the electrolyte, is made in the range of 1:99–40:60 at a temperature of 25° C. Although the reactive resistance in the battery is difficult to reduce, the internal resistance per cell is reduced due to the reduction of the component resistance which is achieved by employing the integrated battery case for accommodating the plurality of cells. Thereby, heat generation in the battery is reduced, higher power output is achieved, and service life characteristics are improved.

The integrated battery case is rectangular shaped, made by coupling together a plurality of prismatic cell cases in line. The electrode plate group is formed by superimposing rectangular shaped positive and negative electrode plates with a separator interposed therebetween. Lead portions of the positive and negative electrode plates protrude to the sides opposite to each other, and the lead portions of the positive and negative electrode plates of adjacent cells are connected within the integrated battery case. The distance of the electric current route from the positive and negative electrode plates to their lead portions are thus shortened, and the electric current route between the adjacent cells is shortened as well, whereby the internal resistance of the battery module is reduced.

Preferably, collector plates are arranged on both sides of the electrode plate group and are welded to the lead portions of the positive and negative electrode plates respectively, whereby adjacent cells are electrically connected within the integrated battery case by connecting the positive and negative collector plates of the cells. The connecting resistance is reduced because the lead portion of each of the electrode plates is connected to the collector plate, and the connecting resistance between the cells is also reduced because the collector plates of In adjacent cells are connected within the integrated battery case.

While novel features of the invention are set forth in the preceding, the invention, both as to organization and content, can be further understood and appreciated, along with other objects and features thereof, from the following detailed description and examples when taken in conjunction with the attached drawings.

DETAILED DESCRIPTION OF THE PREFERRED EMBODIMENTS

Preferred embodiments of the present invention will be hereinafter described with reference to FIGS. 1 to 5, in the form of a battery module employing a nickel metal hydride battery suitable for use as a power source for an electric vehicle as examples.

Figure 1:
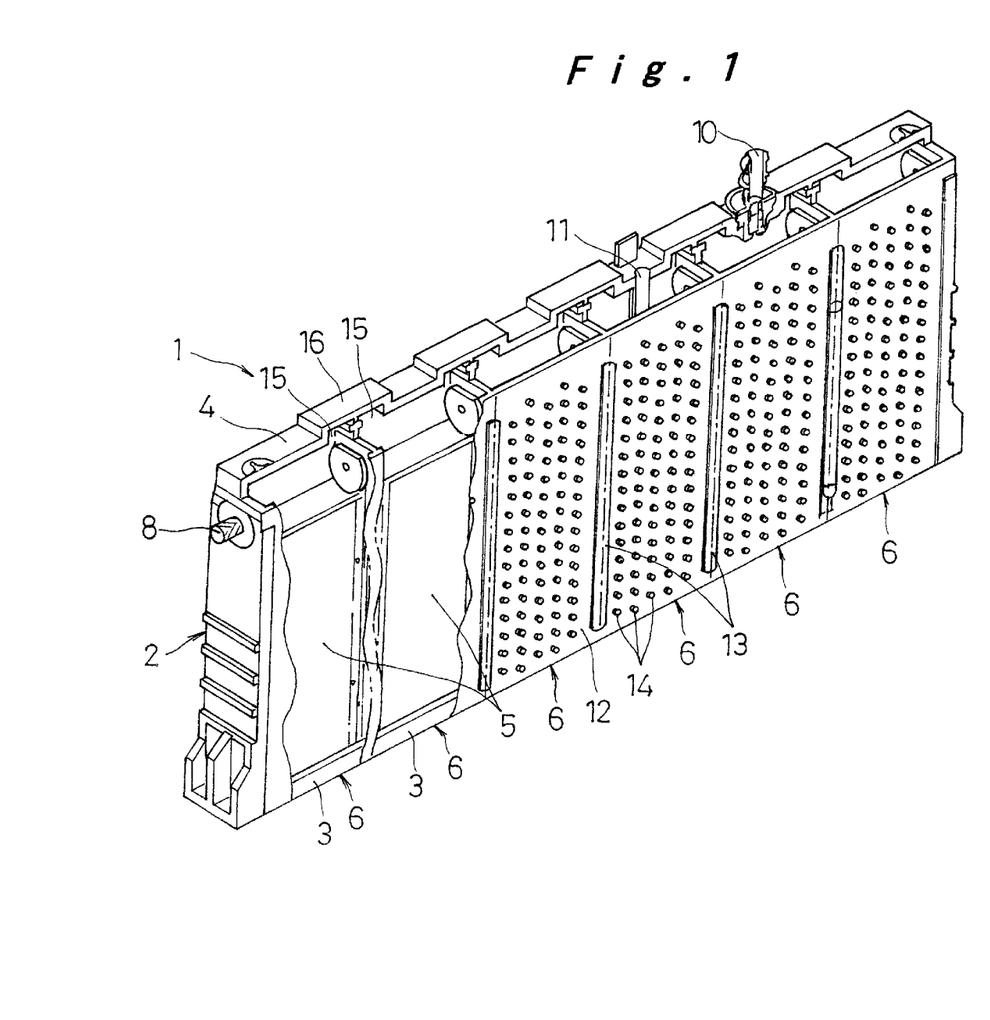
FIG. 1 is a partially cutaway perspective view of a battery module according to an embodiment of the present invention.
Figure 2:
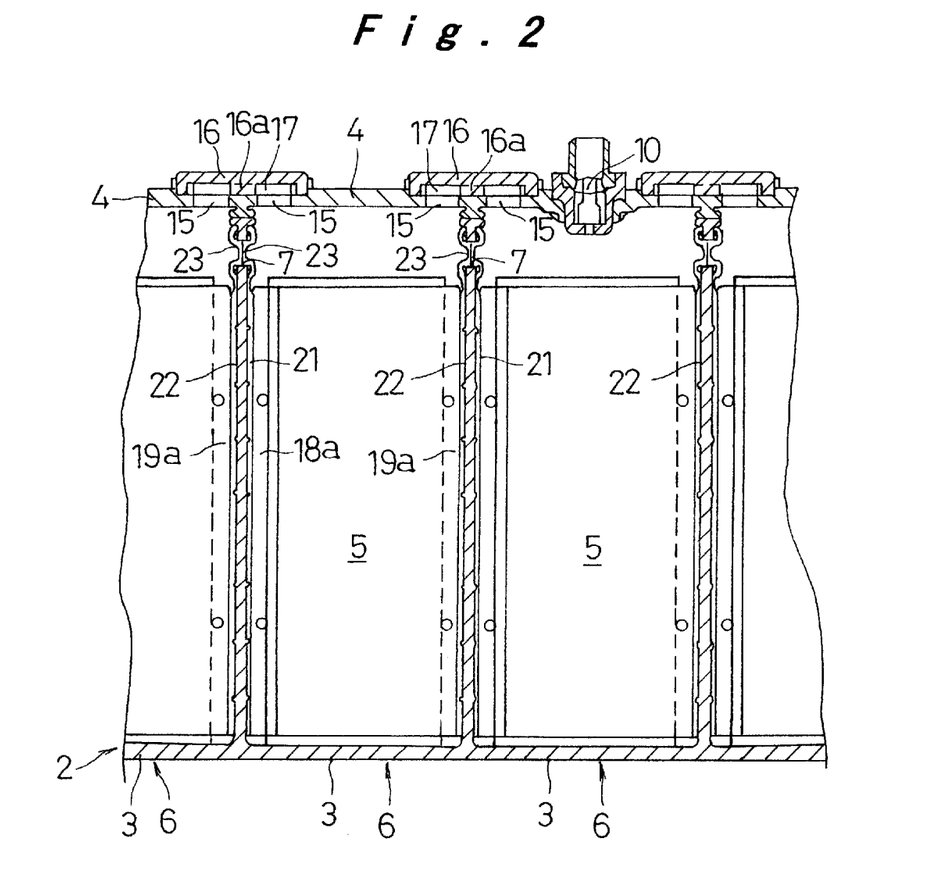
FIG. 2 is a partial longitudinal cross-sectional view of the battery module.

As shown in FIGS. 1 and 2, a battery module 1 of the present invention includes an integrated battery case 2 made by integrally coupling a plurality (six in the example shown in the drawing) of prismatic cell cases 3 having a short side wall, a long side wall, and an open top end, the cell cases 3 sharing their short side walls. The open top ends of the cell cases 3 are closed with an integrated lid 4.

An electrode plate group 5 of a plurality of positive electrode plates and negative electrode plates that are layered in the direction of the short side wall in parallel to the long side wall of the cell case 3 with intervening separators are accommodated in the cell case 3 together with an electrolyte, thus constituting a cell 6.

Connection holes 7 are formed on the upper edge portions of the short side walls at the outer short side walls of the cell cases 3 at the opposite ends of the integrated battery case 2 and between each two cell cases 3, 3. A positive or negative connection terminal 8 is mounted to the connection holes 7 at the outer short side walls of the two outer cell cases 3. Adjacent cells 6, 6 are serially connected through the connection holes 7.

A single safety vent 10 for releasing pressure when the internal pressure in the cell cases 3 has exceeded a certain value is provided on the top face of the lid 4. Moreover, a sensor mounting hole 11 for mounting a temperature detection sensor that detects the temperature in the cells 6 is formed as an indentation, the bottom end of which contacts the upper edge of the electrode plate group 5 of one of the cells 6.

On the long lateral wall 12 of the integrated battery case 2, which is formed as one plane by the long side walls of the cell cases 3, protruding ribs 13 that extend vertically are provided at positions corresponding to the lateral edges of two adjacent cell cases 3. Further, a large number of relatively small circular protrusions 14 are formed at suitable intervals in matrix fashion between each two ribs 13, 13. The ribs 13 and the protrusions 14 have the same height. When the integrated battery cases 2 are arranged in a row in parallel, the ribs 13 and the protrusions 14 form coolant passages for cooling the cell cases 3 effectively and uniformly.

Through holes 15 are formed in the top face of the lid 4 and covered with communicating lids 16 having communicating paths 17 formed therein, so that the communicating paths 17 are positioned above the top face of the lid 4. Numeral 16a represents a reinforcing projection for ensuring the pressure strength of the communicating lid 16. The projection 16a is provided in the middle of the inner wall of the communication lid 16, and its size is such that it does not close the communicating path 17.

Figure 4:
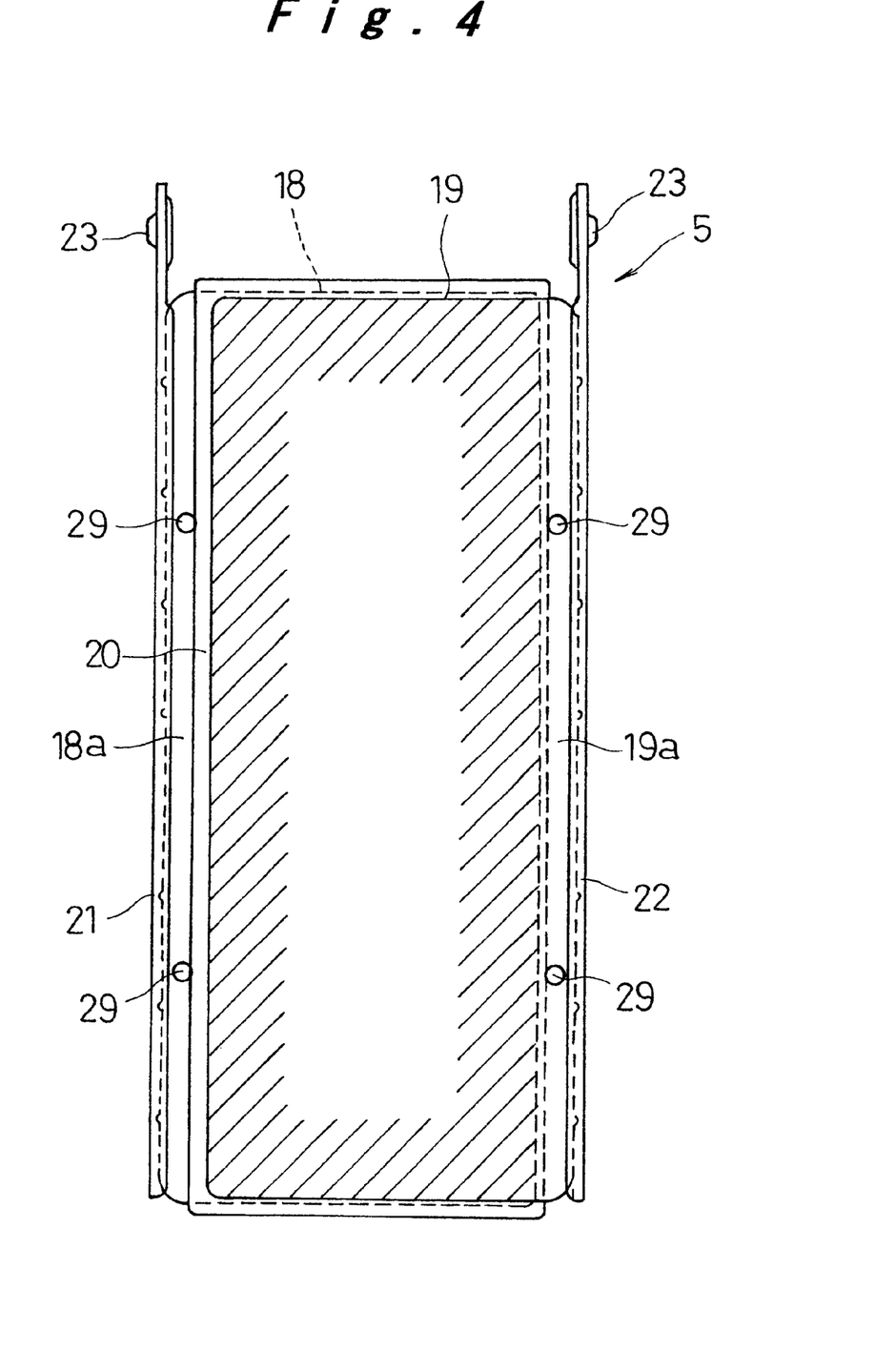
FIG. 4 is a front view of an electrode plate group of the same embodiment.

Next, the electrode plate group 5 is explained in detail with reference to FIGS. 2 and 4. A large number of positive electrode plates 18 and a large number of negative electrode plates 19 are arranged alternately, and the positive electrode plates 18 are covered with separators 20 in the form of a bag having an opening on one side. The positive electrode plates 18 and the negative electrode plates 19 are stacked upon one another with the separators 20 therebetween, thereby constituting the electrode plate group 5. In FIG. 4, the region where the positive electrode plates 18 and the negative electrode plates 19 oppose each other with the intervening separators 20 and generate electric power is indicated by oblique lines. The lateral edges of the group of positive electrode plates 18 protrude beyond the group of negative electrode plates 19 on one side and the lateral edges of the group of negative electrode plates 19 protrude beyond the group of positive electrode plates 18 on the opposite side, and these protruding lateral portions form lead portions 18a and 19a, to the lateral ends of which collector plates 21 and 22 are welded, respectively. The two outer edges of the collector plates 21 and 22 are bent toward the inside and their dimensions are adjusted such that they do not spread to the outside as pressure is applied thereto when they are being welded to the electrode plates 18 and 19. At the outer faces of the electrode plate group 5 between the collector plates 21 and 22, external separators (not shown) are arranged. The positive electrode plate 18 is made of Ni foamed metal filled with nickel hydroxide excluding the lead portion 18a. The lead portion 18a is made by pressurizing and compressing the foamed metal and seam welding a lead plate on one face thereof by ultrasonic-welding. The negative electrode plate 19 is made of Ni punched metal coated with an active material including hydrogen-occluding alloy excluding the lead portion 19a.

Numeral 29 represents a pair of positioning holes formed in the lead portions 18a and 19a at an interval from the top and the bottom thereof. By inserting positioning pins into these positioning holes 29 and by applying pressure on the lateral ends of the lead portions 18a and 19a, these lateral ends of the lead portions 18a and 19a are aligned, so that they are welded evenly to the collector plates 21 and 22.

Figure 3:
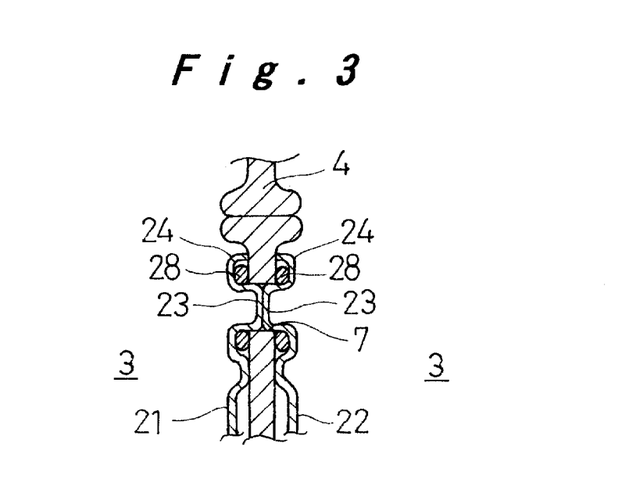
FIG. 3 is a longitudinal cross-sectional view showing the configuration of a portion connecting adjacent cells in the battery module.

FIG. 3 shows the configuration of a portion connecting adjacent cells 6, 6. The cells 6, 6 are connected by inserting from both sides protruding portions 23 of the collector plates 21 and 22 into the connection hole 7 formed in the short lateral wall of the cell case 3, and abutting their leading faces against each other and welding them together. The connection between the cell case 3 on either end and the connection terminal 8 is affected by welding the protruding portion 23 of the collector plate 21 or 22 and a protruding portion of the connection terminal 8. Annular grooves 24 are formed around the protruding portion 23 and the protruding portion of the connection terminal 8, and the connection hole 7 is sealed double with O-rings 28 mounted in these annular grooves 24.

In the battery module 1 of the present invention, as described above, the integrated battery case 2 is constituted by connecting a plurality of prismatic cell cases 3, abutted on their short side walls. The open ends of the cell cases 3 are closed by the integrated lid 4, and the collector plates 21, 22 of the electrode plate groups 5 in adjacent cells 6 are serially connected by inserting the protruding portions 23 of the collector plates 21 and 22 into the connection holes 7 formed in the upper edges of the short side walls of each cell case 3, and welding the protruding portions 23 together.

Accordingly, the connecting components are eliminated from the battery module 1, whereby the connecting resistance between the cells 6, 6 is reduced and the costs are lowered. Moreover, since neighboring cells 6 are connected within the integrated battery case 2, and the connection portions are not exposed to the outside, the space that the battery module 1 occupies is made compact.

Further, the average distance from the full-face of the electrode plates 18 and 19 to the collector plates 21 and 22 is shortened since the collector plates 21 and 22 are fixed full-length to the lead portions 18a and 19a of the positive and negative electrode plates 18 and 19. Consequently, the internal resistance of the battery module is reduced, and the active material of the electrode plates is utilized more effectively, whereby the battery power output is improved.

Furthermore, the electrode plates 18 and 19 are supported in a compact configuration constituted by the collector plates 21 and 22, the electric power generating area of the electrode plate is widened, and the battery capacity is increased.

Due to the reduction of the internal resistance of the battery module, heat generation in the battery is suppressed. Even when the integrated battery case 2 made of resin and exhibiting low cooling performance is employed, the temperature rise in the battery is suppressed, and deterioration of power output and drop in service life performance is prevented.

Figure 5:
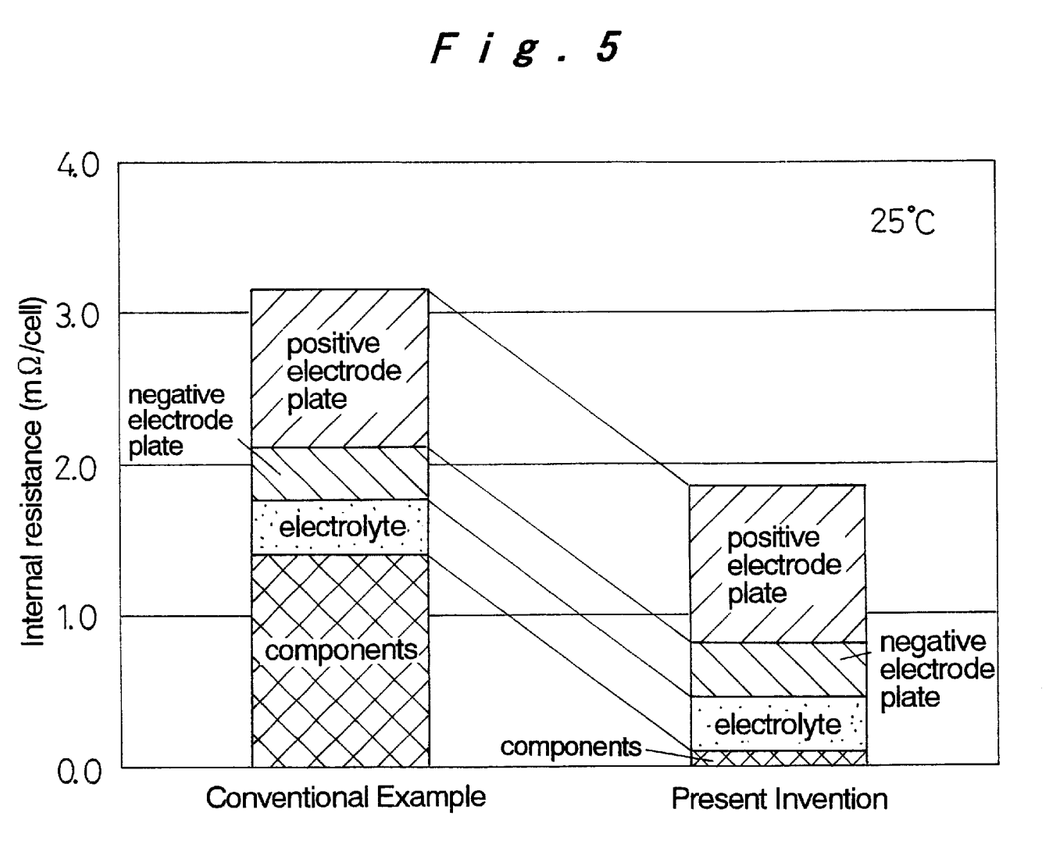
FIG. 5 is a graph displaying the internal resistance per cell of the battery module of the present invention and that of a conventional battery module.

In the battery module described above, the component resistance of the components of each cell 6, and the connecting resistance between the cells 6 is substantially reduced. As shown in FIG. 5, the ratio of the component resistance including the connecting resistance between the cells 6 to the reactive resistance of the electrode plate group 5 and the electrolyte in each cell 6, is made in the range of 1:99–40:60 at a temperature of 25° C. In other words, although the reactive resistance in the battery is difficult to reduce, the internal resistance per cell 6 is reduced by reducing the component resistance per cell. Thereby, heat generation in the battery is reduced, and higher power output and improved service life characteristics are achieved.

The constitution of the electrode plate group 5 in the cell 6, and the connecting configuration between the cells 6 are not limited to the embodiment described above.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A battery module comprising:
   a plurality of cells including a cell case for accommodating an electrode plate group and an electrolyte; and
   an integrated battery case for accommodating the plurality of cells,
   wherein a ratio of component resistance including connecting resistance between the cells, to reactive resistance of the electrode plate group and the electrolyte in each cell is within a range of 1:99 to 40:60 at a temperature of 25° C.

2. The battery module according to claim 1, wherein the cell includes a prismatic cell case having a short side wall and a long side wall, and the integrated battery case is constituted by coupling the plurality of cell cases in line,
   a connection hole is formed on an upper edge portion of the short side wall of the cell case,
   the electrode plate group is formed by superimposing a rectangular positive electrode plate and a rectangular negative electrode plate with a separator interposed therebetween,
   lateral edge portions of the positive electrode plate and the negative electrode plate protrude sideways on the opposite side of each other, thereby forming lead portions, and
   the electrical connection between adjacent cells is affected by connecting the lead portions through the connection hole within the integrated battery case.

3. The battery module according to claim 2, wherein the lead portions of the positive electrode plate and the negative electrode plate are connected to collector plates arranged on both sides of the electrode plate group, and
   electrical connection between adjacent cells is affected by connecting the collector plates through the connection hole within the integrated battery case.

* * * * *

UNITED STATES PATENT AND TRADEMARK OFFICE
CERTIFICATE OF CORRECTION

PATENT NO. : 6,602,636 B2
DATED : August 5, 2003
INVENTOR(S) : A. Taniguchi et al.

It is certified that error appears in the above-identified patent and that said Letters Patent is hereby corrected as shown below:

Column 6,
Line 39, "affected" should be -- effected --.

Signed and Sealed this

Twenty-second Day of June, 2004

JON W. DUDAS
*Acting Director of the United States Patent and Trademark Office*